(12) United States Patent
Weidenhaus (10) Patent No.: US 11,219,223 B2
(45) Date of Patent: Jan. 11, 2022

(54) CLIPPING MACHINE WITH SECURED ACCESS TO THE CLIPPING REGION

(71) Applicant: Poly-clip System GmbH & Co. KG, Hattersheim (DE)

(72) Inventor: Björn Weidenhaus, Linden (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 16/850,785

(22) Filed: Apr. 16, 2020

(65) Prior Publication Data

US 2020/0329721 A1 Oct. 22, 2020

(30) Foreign Application Priority Data

Apr. 18, 2019 (EP) ..................................... 19170092

(51) Int. Cl.
*A22C 11/00* (2006.01)
*A22C 11/12* (2006.01)
(Continued)

(52) U.S. Cl.
CPC .......... *A22C 11/125* (2013.01); *A22C 11/008* (2013.01); *A22C 11/0263* (2013.01); *A22C 11/10* (2013.01)

(58) Field of Classification Search
CPC ... A22C 11/008; A22C 11/02; A22C 11/0245; A22C 11/10; A22C 11/125
(Continued)

(56) References Cited

U.S. PATENT DOCUMENTS 8,870,635 B2 * 10/2014 Topfer ................... A22C 11/02
452/45
9,714,106 B2 * 7/2017 May ..................... A22C 11/005
(Continued)

FOREIGN PATENT DOCUMENTS

DE 202015000030 U1 4/2016
DE 202015000030 U1 5/2016
(Continued)

OTHER PUBLICATIONS

Russian Patent Office; Application No. 2020113594; Official Action dated Dec. 14, 2020.
(Continued)

*Primary Examiner* — Richard T Price, Jr.
(74) *Attorney, Agent, or Firm* — Fitch, Even, Tabin & Flannery LLP (57) ABSTRACT

The present invention relates to a clipping machine for producing sausage-shaped products, like sausages, containing a flowable filling material in a tubular or bag-shaped packaging casing, the machine comprising a filling tube configured to feed filling material into the casing, and further comprises closing tools arranged downstream the filling tube, for closing the casing in a closing region. A housing is provided, enclosing at least the closing region, comprising at least a front wall and a first side wall, wherein the front wall is arranged at least substantially parallel to a longitudinally extending axis of the filling tube, and further comprises an opening which can be closed by a movable door element, movable between an open position, allowing access to the closing region and a closed position, covering and blocking access to the closing region. The side wall faces the filling tube and further comprises a movable housing element, movable between at least an open position and a closed position, wherein the movable housing element comprises an opening for passing through the sausage-shaped products,
(Continued)

and wherein the movable housing element enables access from a side of the first side wall to the closing region when in the open position; and wherein the movable housing element covers and blocks access to the closing region when in the closed position.

15 Claims, 8 Drawing Sheets

(51) Int. Cl.
*A22C 11/02* (2006.01)
*A22C 11/10* (2006.01)

(58) Field of Classification Search
USPC .................................. 452/30–32, 46–48, 51
See application file for complete search history.

(56) References Cited

U.S. PATENT DOCUMENTS

| | | | | |
|---|---|---|---|---|
| 2017/0172163 A1* | 6/2017 | Ebert | .................. | A22C 11/0245 |
| 2017/0172164 A1* | 6/2017 | Ebert | .................. | A22C 11/008 |
| 2019/0335768 A1* | 11/2019 | Mach | .................. | A22C 11/0227 |
| 2020/0329721 A1* | 10/2020 | Weidenhaus | ....... | A22C 11/0263 |
| 2020/0345501 A1* | 11/2020 | Bundy | ................ | A61L 27/3612 |

FOREIGN PATENT DOCUMENTS

| | | | |
|---|---|---|---|
| EP | 1428437 | A1 | 6/2004 |
| EP | 1671545 | A1 | 6/2006 |
| EP | 2384637 | A2 | 11/2011 |
| EP | 3183970 | A1 | 6/2017 |
| EP | 3183971 | A1 | 6/2017 |

OTHER PUBLICATIONS

EPO; Application No. 19170092.1; Extended European Search Report dated Nov. 6, 2019.
Russian Patent Office; Application No. 2020113594;Official Action dated Jul. 23, 2020.

* cited by examiner

CLIPPING MACHINE WITH SECURED ACCESS TO THE CLIPPING REGION

CROSS-REFERENCE TO RELATED APPLICATION

The present application claims the benefit of priority of European Patent Application No. 19170092.1 filed on Apr. 18, 2020, the contents of which are incorporated herein by reference in their entirety.

FIELD OF THE INVENTION

The present invention relates to a clipping machine for producing sausage-shaped products as defined in the preamble of claim 1. In particular, the present invention concerns a clipping machine for producing sausage-shaped products, like sausages, which contain a flowable filling material in a tubular or bag-shaped packaging casing, wherein the clipping machine comprises filling means having a longitudinally extending axis, the filling means configured to feed filling material into the tubular or bag-shaped packaging casing, closing means arranged downstream the filling means, for closing the tubular or bag-shaped packaging casing in a closing region, and a housing enclosing at least the closing region and comprising at least a front wall and a first side wall. The front wall is arranged at least substantially parallel to the longitudinally extending axis of the filling means and further comprises an opening which can be closed by a movable door element being moveable between an open position allowing access to the closing region, and a closed position covering the closing region for blocking access to it, wherein the side wall faces the filling means and intersects the longitudinally extending axis of the filling means.

BACKGROUND OF THE INVENTION

In practice, it is known that, for example in the production of sausage-shaped products, like sausages, filling material is fed by a filling machine through a filling tube forming a component of filling means or a filling device including a filling tube, of a clipping machine into a tubular packaging casing which is stored on the filling tube and which is closed at its front end, i.e. the end pointing in the feeding direction of the filling material by a closure means, like a closure clip. The tubular packaging casing is pulled-off from the filling tube while being filled by the feeding pressure. A casing brake applies a frictional force to the tubular packaging casing while being pulled-off from the filling tube, in order to control the pull-off motion of the tubular packaging casing. After a predetermined amount of filling material has been filled into said tubular packaging casing, gathering means with a first and a second displacer unit which can each be formed by a pair of reversibly moveable displacement elements, form a plait-like portion of the tubular packaging casing which is at least approximately free from filling material.

The clipping machine then places and closes at least one closure clip at the plait-like portion forming the rear end of the sausage-shaped product, i.e. the end pointing against the feeding direction, by a clipping device having respective closing tools which are reversibly movable towards the plait-like portion.

The gathering means together with the closing tools form the closing means or a closing device of the machine. A section of the machine, which extends from a downstream end of the filling tube at least to a downstream facing side of the closing means defines a clipping or closing region, respectively. In other words, the closing region is the section of the machine, in which the plait-like portion on the tubular packaging casing is formed, and in which the closing tools apply at least one closure clip to the plait-like portion.

In order to prevent an operator from reaching into the movable parts of the clipping machine during the production process, like the gathering means, the closing tools and/or parts of the drive means for driving the clipping machine etc., known clipping machines are provided with a coverage or housing.

For refilling tubular packaging casing, e.g. prepackaged casing material, on the filling tube, the filling tube can reversibly be pivoted preferably in an at least substantially horizontal plane wherein the casing brake is simultaneously or afterwards removed from the filling tube. The tubular packaging casing is then shifted onto the filling tube, with its front end facing towards the gathering means. The front end of said tubular packaging casing, typically, is already closed by a closure clip. Accordingly, the operator has to guide this end of the tubular packaging casing through the casing brake, through the gathering means and past the closing tools for placing at least the closure clip downstream the closing means. Thus, the operator needs access not only to the filling tube and the casing brake, but also to the closing means, which usually are covered by the housing of the clipping machine, or at least by portions thereof.

EP patent application 3 183 970 discloses a clipping machine with a housing that includes a movable door element in a front wall of the housing which covers at least an opening in the housing allowing access to the closing region, wherein the movable door element can be reversibly shifted relative to the clipping machine, so that access is granted to the closing region. The movable door element therefore enables an operator to access the closing region to guide the tubular packaging casing through the gathering means.

For a reliable closing operation, the casing brake assembly and the closing means of the known clipping machines, such as the clipping machine disclosed in EP patent application 3 183 970, are desirably arranged in close proximity with small clearances. Typically, a side wall of the housing, which includes an opening for passing through the sausage-shaped products to be produced and substantially covers the closing region of the machine, is arranged between the casing brake assembly and a first displacer unit of the gathering means. However, due to the small clearances between the side wall and the first displacer unit as well as between the side wall and the casing brake assembly arranged at the downstream end of the filling tube, the space for carrying out, for example, cleaning and/or maintenance operations is restricted. A movable door element in the front wall of the machine, as disclosed in EP patent application 3 183 970, grants access to the closing region from a side of the front wall of the machine, but does not affect the tight fit of other housing elements, especially that of the side wall.

However, access to the gathering means from the side where the filling tube is arranged may be desirable in many instances, not only by leading the front end of new casing material arranged on the filling tube past the closing means of the clipping machine, but also during cleaning of the machine. A small amount of product which is to be filled in the tubular packaging casings might leak into a gap between the first displacer unit and the side wall, or between the front end of the filling tube or the casing brake and the side wall. Furthermore, residue material or scrap of the tubular packaging casing might migrate into said gaps. Other instances, which could necessitate extensive cleaning and therefore access to the side close to the closing means, include a burst of a tubular packaging casing during filling. Besides cleaning, maintenance can profit from the ability to reach the closing means from a direction of an upstream side wall. While providing access during cleaning and/or maintenance, it still has to be ensured that, during operation of the machine, the closing region and all moving parts therein are safely separated from the operator of the machine.

It is thus an object of the present invention to provide a clipping machine which overcomes the above-mentioned drawbacks and which enables easy and secure operation of the machine, while providing improved access to its movable parts, for example for cleaning or maintenance purposes.

SUMMARY OF THE INVENTION

According to the present invention, there is provided a clipping machine for producing sausage-shaped products, like sausages, that contain a flowable filling material in a tubular or bag-shaped packaging casing. The clipping machine comprises filling means or filling device, closing means or closing device and a housing. The filling means have a longitudinally extending axis and are configured to feed filling material into the tubular or bag-shaped packaging casing. The closing means are arranged downstream the filling means and are configured to close the tubular or bag-shaped packaging casing in a closing region. The housing encloses at least the closing region and comprises at least a front wall and a first side wall, wherein the front wall is arranged at least substantially parallel to the longitudinally extending axis of the filling means, and wherein the first side wall faces the filling means and intersects the longitudinally extending axis of the filling means. The front wall further comprises an opening which can be closed by a movable door element being moveable between an open position allowing access to the closing region, and a closed position covering the closing region for blocking access to it. The side wall of the inventive clipping machine further comprises a movable housing element, which is movable between at least an open position and a closed position. The movable housing element comprises an opening for passing through the sausage-shaped products to be produced. When in the open position, the movable housing element enables access to the closing region from a side of the first side wall. When in the closed position, the movable housing element covers the closing region. The opening in the movable housing element is aligned with the longitudinally axis of the filling means and dimensioned to be able to pass a tubular packaging casing, stored on the filling tube of the filling means, therethrough into the closing region, while preventing extremities of the operator or other foreign and unwanted objects to access the closing region. It furthermore has to be understood that the movable housing element forms a part of the side wall, and when in the open position, provides an opening to the closing region. The opening is covered by the movable housing element in the closed position.

By providing a movable housing element in the first side wall which can provide an opening to the closing region, the inventive clipping machine enables an operator to access the closing region from a side of the first side wall during a refilling operation of new closing material and/or for cleaning, maintenance or other purposes. In a related manner, the clipping machine may preferably be outfitted with a sensor device for detecting the open and closed position of the movable housing element. A control unit of the clipping machine may be configured so as to prevent operation of the machine when the open position of the movable housing element is detected by the sensor device, thereby providing additional safety to the operator.

The movable housing element may reversibly be moved from an open to a closed position in a variety of different ways, including but not limited to, shifting or rotating. A movement of the movable housing element is preferably performed in a plane of the first side wall, which is preferably at least substantially perpendicular to the longitudinally extending axis of the filling means, so as not to interfere with the filling means, thereby enabling the filling means to remain in place when the movable housing element is opened. The movable housing element may be moved into positions other than the open or closed position, such as intermediate positions therebetween, or further positions which are located farther away from the closed position than the open position, in an angular or linear sense, or a combination thereof. Such further positions may, for example, facilitate full removal of the removable housing element from the clipping machine, for example for repair or disassembly.

In a preferred embodiment of the inventive clipping machine, a closed position of the door element may block the movable housing element from being moved into the open position. Moreover, an open position of the movable housing element may block the door element from being moved into the closed position. It is thereby ensured that the movable housing element can only be opened after the door element has been opened and it is further ensured that the door element can only be closed once the movable housing element has been moved into the closed position. Such an arrangement provides additional safety to the operator, as the sequence of opening and closing of the movable housing element and the door element of the clipping machine is predetermined.

In a further preferred embodiment of the inventive clipping machine, wherein the operation of the clipping machine is prevented when the door element is in the open position, as will be described in a following section, this arrangement further ensures the safety of the operator, without the need for a second sensor element that detects the position of the movable housing element.

Such an arrangement may be realized by a door element that is arranged such that it is situated in the plane of movement of the movable housing element when the door element is in the closed position, and wherein the door element is moved out of the plane of movement of the movable housing element when the door element is moved into the open position. Then the movable housing element is free to move to the open position and is being moved within its plane of movement, such that its open position lies within the range of motion of the door element, which the door element passes through when moving from the open position to the closed position.

In a further preferred embodiment of the inventive clipping machine, the movable housing element further may be a flat element which preferably has substantially the same thickness as an adjacent portion of the first side wall. When, for example, the housing is made from sheet metal, the movable housing element can be made from the same type of material. In addition to simplifying logistics during manufacturing of the clipping machine, this enables the movable housing element to be flush with both surfaces of the adjacent portion of the side wall.

In a further preferred embodiment of the inventive clipping machine, the movable housing element can further comprise at least one stiffening member. Such a stiffening member can be advantageous when, for example, the movable housing element is made from the same material and has the same thickness as the adjacent portion of the side wall, as in the above described preferred embodiment. Such sheet metal may only have limited bending stiffness, which could therefore, for example, lead to the movable housing element deflecting into regions of the interior or the surroundings of the machine. Such deflection may occur during movement of the movable housing element, or be caused by vibrations of the clipping machine during operation, and be undesired as it could, for example, interfere with moving parts in the closing region or cause a misalignment of the filling means and the opening in the movable housing element. Providing at least one stiffening member with the movable housing element can prevent undesired deflection. The stiffening member may, for example, be a section of increased thickness or a beam bonded to the movable housing element.

In a further preferred embodiment of the inventive clipping machine, the stiffening member may be disposed at a portion of the movable housing element that is adjacent to the door element, when the door element and the movable housing element are in the closed position. Said portion of the movable housing element that is adjacent to the door element, when door element and housing element are in the closed position, might be stiffened by engaging the door element when the door element is in the closed position. When the door element is opened, the stiffening effect enacted upon the movable housing element is removed. With the stiffening member disposed on the section of the movable housing element which is adjacent to the door element, when door element and movable housing element are in the closed position, it is ensured that the movable housing element remains stiffened in said section, even when the door element is in the open position. The stiffening member may also serve as a handle to open the movable housing element after opening the door element.

In a further preferred embodiment of the inventive clipping machine, the movable housing element may further comprise a rotational joint. The axis of rotation of the rotational joint is substantially parallel to the longitudinally extending axis of the filing means, and the movable housing element is moved between the open and the closed position by rotating around said axis of rotation. Thereby, the movable housing element moves in a plane that is substantially perpendicular to the longitudinally extending axis of the filling means, ensuring that the movable housing element does not collide with the filling means in any position along its range of movement.

The rotational joint of a further preferred embodiment of the inventive clipping machine may be arranged at a position towards a bottom of the portion of the first side wall which is adjacent to the movable housing element. Thus, the center of mass of the movable housing element is located above the axis of rotation in such a way that the torque which the mass of the movable housing element exerts upon its axis of rotation is always directed such that the current position, open or closed, of the movable housing element is stable and maintained without further measures. In other words, when the movable housing element is rotated in the open position, it tends to remain in the open position, and poses no risk of moving into the closed position without external forces applied. Thereby, an unintended closing of the movable housing element and subsequent potential injury of an operator working in the range of movement of the movable housing element can be prevented.

In a further preferred embodiment of the inventive clipping machine, the movable housing element can further comprise a locking mechanism for releasably locking the movable housing element in the closed position. Such a locking mechanism may act as an additional safety measure to prevent the movable housing element from being opened unintentionally.

In a further preferred embodiment of the inventive clipping machine, the movable housing element can comprise at least one guide element that prevents the movable housing element from deflecting into the closing region. Such a guide element may be particularly advantageous, when the movable housing element is of relatively low bending stiffness, such as, for example, when the movable housing element is made from the same material having the same thickness as the adjacent portion of the first side wall. The guide element can guide the movable housing element along the adjacent first side wall, so that during movement from the open to the closed position, and vice versa, the movable housing element does not deflect into the closing region of the clipping machine. The guide element can further prevent the movable housing element from deflecting into the closing region of the clipping machine during operation of the machine, when the movable housing element is in the closed position.

The at least one guide element of a further preferred embodiment of the inventive clipping machine can further be disposed on a side of the movable housing element that faces the filling means, and further extends beyond the outer rim of the movable housing element. The guide element thereby provides form closure against the adjacent side wall, which prevents the movable housing element from deflecting into the closing region of the clipping machine.

In a further preferred embodiment of the inventive clipping machine, the first side wall can further comprise at least one stopper element which is disposed on a side of the first side wall which faces the filling means. The stopper element can extend beyond the rim or edge of the first side wall toward the movable housing element, and the stopper element prevents the movable housing element from deflecting in a direction opposite the closing region. The stopper element can therefore engage the movable housing element and provide form closure, so that the movable housing element may not deflect in a direction opposite the closing region. Such a stopper element may be particularly advantageous, when the movable housing element is of relatively low bending stiffness, such as, for example, when the movable housing element is made from the same material having the same thickness as the adjacent portion of the first side wall.

The movable housing element of the inventive clipping machine may in a further preferred embodiment further comprise a centering mandrel which is configured for centering an assembly of multiple filling means on the clipping machine. Such an assembly may increase the efficiency of the clipping machine, as production may speedily be switched between different packaging casings and filling materials.

In a further preferred embodiment of the inventive clipping machine, the door element may further comprise a shifting mechanism, wherein the door element is movable between the open and the closed position by shifting in a plane parallel to the longitudinally extending axis of the filling means.

In a further preferred embodiment of the inventive clipping machine, the door element may further comprise a hinge mechanism, with an axis of rotation in a plane parallel to the longitudinally extending axis of the filling means or extending at least substantially vertical to the longitudinally extending axis of the filling means.

In a further preferred embodiment of the inventive clipping machine, a sensor device may further be provided for detecting at least the closed position of the door element. The sensor may be relaying information on the closed position of the door element to a control unit preferably provided. The control unit may impede the operation of the machine as long as the closed position of the door element is not detected. Thereby, it can be ensured that the clipping machine is not unintentionally activated, when, for example, an operator performs maintenance or cleaning operations within the machine. In a further aspect, when the open position of the movable housing element blocks the door element from being moved into the closed position, a single sensor device for the door element is sufficient to ensure that the machine is not operated while any one of the movable housing element and/or the door element is in the open position.

Further advantages and a preferred embodiment of the present invention will be described in the following together with the drawings listed below.

Expressions such as "up", "down", "above", "below", "on top", "beneath" or analogous expressions for a relative spatial position along a vertical or horizontal axis are defined relative to a viewer's perspective on the drawings, with the depicted orientation of the machine substantially coinciding with the upright position of the machine during operation, wherein the machine is typically set up on a floor. Expression such as "down", "below", "beneath" or analogous expressions relate to a relative position closer to the floor, and "up", "above", "on top" or analogous expressions relate to a relative position further away from the floor.

Expressions such as "in front", "behind", "left" and "right" or analogous expressions for a spatial position relative to a viewer are defined relative to the viewer's perspective view on the drawings, wherein "in front" or analogous expressions relate to a relative position closer to the viewer, and "behind" or analogous expressions relate to a relative position further away from the viewer.

DETAILED DESCRIPTION

Figure 1:
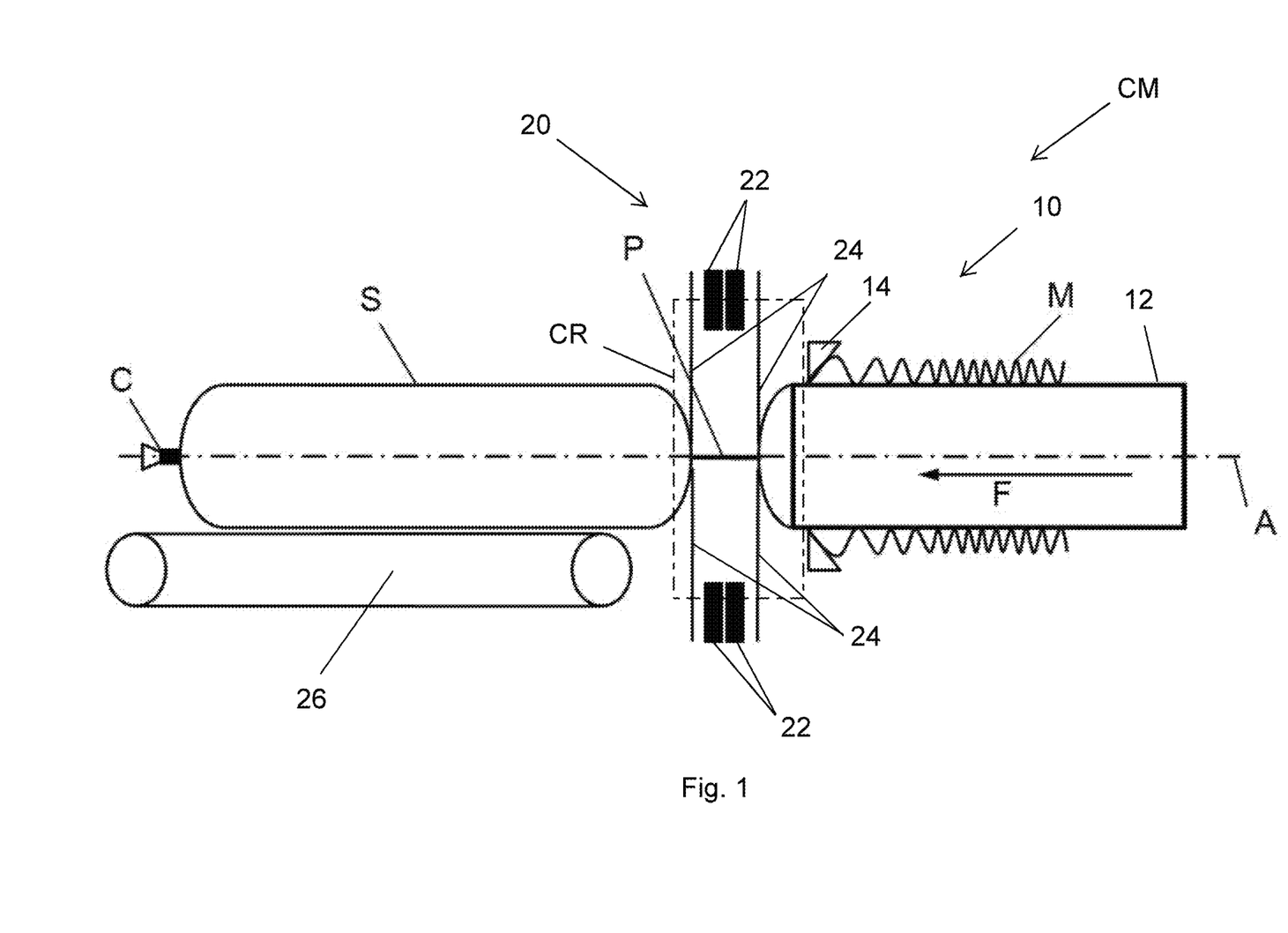
FIG. 1: is a schematic view of a clipping machine according to the present invention.

A clipping machine CM for producing sausage-shaped products S shown in FIG. 1 comprises, as main components, filling means or filling device 10 which comprise a cylindrical filling tube 12 having a longitudinally extending central axis A and being made of a suitable material, like stainless steel. A tubular packaging casing M made of a thin sheet material is stored on the filling tube 12. Clipping machine CM further includes closing means or closing device 20. Closing means 20 comprise two pairs of clipping tools 22 and gathering means 24 for gathering the filled tubular packaging casing M and for forming a plait-like portion P thereto which are arranged downstream filling tube 12. Plait-like portion P is at least approximately free of filling material. Clipping tools 22 comprising at least one punch and one die for closing one closure means, like a closure clip C, are provided for closing the filled tubular packaging casing M by applying said at least one closure means to said plait-like portion P. In the shown embodiment of clipping machine CM, clipping tools 22 include two punches and two dies for applying simultaneously two closure clips C to plait-like portion P to close the rear end of sausage-shaped product S just produced and the front end of sausage-shaped product S to be produced next.

It has to be understood that clipping machine CM may be provided with a control unit for controlling operation of the components of clipping machine CM.

As further can be inferred from FIG. 1, at least substantially horizontally arranged filling tube 12 has a left end facing closing means 20 and a right end coupled to a filler arrangement (not shown in FIG. 1) including a pump for feeding filling material through filling tube 12 in a feeding direction F into tubular packaging casing M closed on its end facing in the filling direction F by a closure clip C. The term "downstream" within the scope of this disclosure relates to a relative position in the direction of feeding direction F, whereas the term "upstream" relates to a relative position opposite the direction of feeding direction F.

A casing brake assembly 14 is arranged on filling tube 12 in the vicinity of the left end of the filling tube 12 in order to control the movement or pull-off speed of tubular packaging casing M when pulled-off from filling tube 12 resulting from the filling pressure of the filling material, by applying a frictional force to tubular packaging casing M.

Positioned immediately downstream the left end of filling tube 12, closing means 20 are arranged and coaxially aligned to filling tube 12. Gathering means 24 include a first displacer unit and a second displacer unit, each including a pair of displacer elements, wherein the first displacer unit is positioned downstream the second displacer unit. First and second pair of clipping tools 22 of closing means 20 are positioned between first and second displacer units of gathering means 24 for applying one or two closure clips C to plait-like portion P.

Furthermore, for discharging sausage-shaped product S just produced in clipping machine CM, downstream closing means 20, a transportation device preferably in form of a belt conveyor 26 is arranged, comprising a conveyor belt and guide rollers. The transportation direction of belt conveyor 26 coincides with feeding direction F. The height of the upper conveyor belt section of belt conveyor 26 is aligned to the lower side of sausage-shaped product S to be produced and discharged from clipping machine CM.

A closing region CR extends between the left or downstream end of filling tube 12 and the upstream end of belt conveyor 26 facing towards filling tube 12. Closing region CR defines the area of clipping machine CM, through which filled tubular packaging casing M is moved and in which filled tubular packaging casing M is gathered by gathering means 24 for forming plait-like portion P, and at least one closure clip C is applied to plait-like portion P by clipping tools 22. Closing means 20 are arranged such that at least clipping tools 22 and first and second displacer units of gathering means 24 extend into closing region CR.

Figure 2:
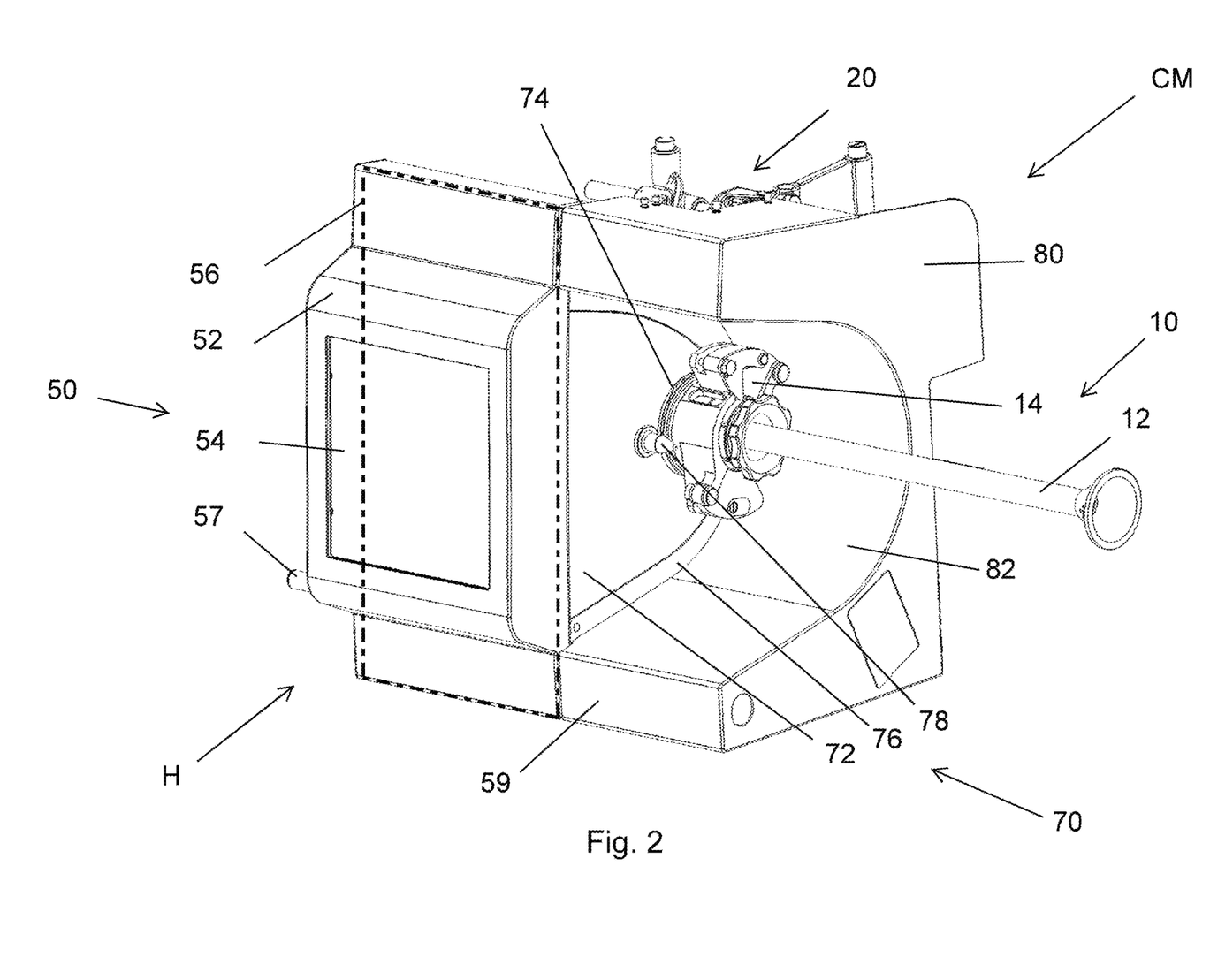
FIG. 2: is a perspective exterior view of an inventive clipping machine, with a movable door and a movable housing element in their respective closed positions.

FIG. 2 shows clipping machine CM of FIG. 1 with closing region CR being enclosed by a housing H. Housing H comprises a front wall 50 and a first side wall 70, with front wall 50 being arranged substantially parallel to the longitudinally extending central axis A of filling means 10 and first side wall 70 facing filling means 10. The perspective view of FIG. 2 enables a portion of closing means 20, which are enclosed by housing H, to be seen. It has to be understood that housing H may comprise further wall elements besides the depicted front wall 50 and first side wall 70, such as a second side wall opposite to first side wall 70 and adjacent to a downstream side of closing region CR, as well as a top, bottom and rear wall. While not depicted in FIG. 2, clipping machine CM may further comprise a support frame for setting up machine CM on a floor.

Front wall 50 of housing H comprises a movable door element 52 with a window 54. Movable door element 52 is depicted in its closed position in FIG. 2, therefore closing an opening 56 in front wall 50 and covering closing region CR. Thus, an operator is prevented from reaching into closing region CR and, for example, suffering injury from the movable parts of closing means 20 when machine CM is in operation. Window 54 enables the operator to observe the proper functioning of closing means 20, even when movable door element 52 is in the closed position. Movable door element 52 may further include a handle 57 which aids in opening and closing of movable housing element 52.

Side wall 70 further comprises a movable housing element 72 which comprises an opening 74 for filling means 10. In FIG. 2, movable housing element 72 is depicted in a closed position, closing an opening in an adjacent portion 76 of side wall 70. The closed position of movable housing element 72 covers closing region CR, thus preventing an operator from reaching into closing region CR and, for example, suffering injury from the movable parts of closing means 20 when machine CM is in operation.

Filling means 10 are arranged coaxially with a circular opening 74, at a desirably minimal distance, to reduce the free length of tubular packaging casing M which is pulled-off from filling means 10 and through opening 74 by gathering means 24. Opening 74 is preferably sized so as to leave a desirably minimal clearance in a direction perpendicular to feeding direction F between movable housing element 72 and tubular packaging casing M which is being pulled therethrough. Thereby, the closed position of movable housing 72 effectively prevents, inter alia, undesired access of an operator, or the introduction of foreign objects, into closing region CR.

In the depicted embodiment, movable housing element 72 further comprises a centering mandrel 78 which extends from the surface of movable housing element 72 which faces filling means 10 in an upstream direction. Centering mandrel 78 is configured to center an assembly of multiple filling means 10 on clipping machine CM. Such an assembly may increase the efficiency of clipping machine CM, as production may speedily be switched between different packaging casings M and filling materials. It has to be understood, however, that other embodiments of the present invention may not comprise centering mandrel 78.

Figure 4:
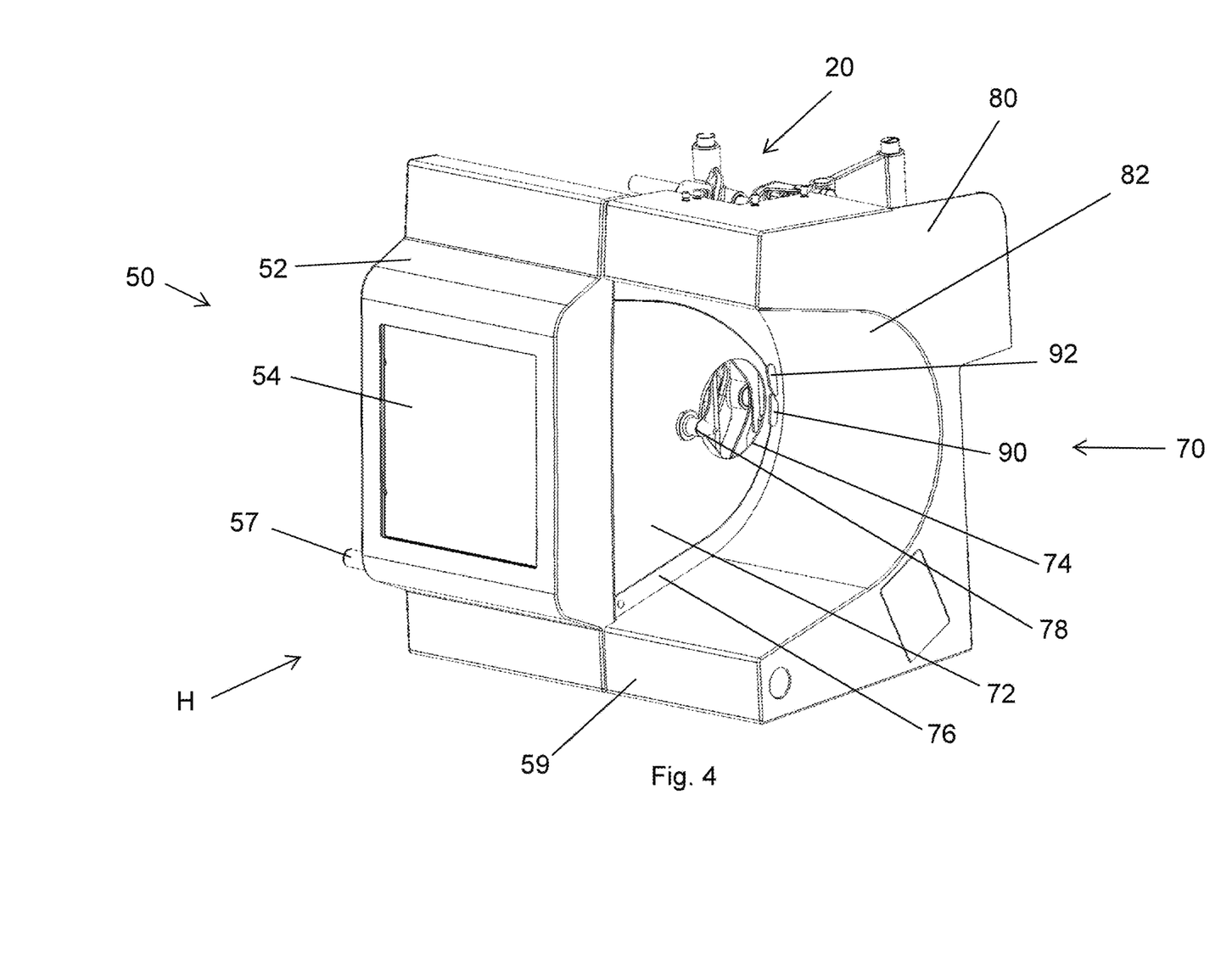
FIG. 4: is a perspective exterior view of the clipping machine of FIG. 2 with filling means removed.

FIG. 4 is the same perspective on clipping machine CM as FIG. 2, however filling means 10 are not depicted, providing a better view on opening 74 and allowing to see portions of closing means 20 therethrough, which are disposed on the interior facing side of movable housing element 72 with minimal clearance.

In the embodiment of FIGS. 2 and 4, portion 76 of side wall 72, which is adjacent to movable housing element 72, is recessed in a downstream direction with respect to an upstream portion 80 of first side wall 70. Upstream portion 80 and portion 76 form a recess 82, wherein filling means 10 are arranged. It has to be understood, however, that inventive clipping machine CM is not limited to a configuration with recess 82, alternatively first side wall 70 may, for example, form a continuous and flush surface, which faces filling means 10.

It has to be further understood that housing H, and in particular front wall 50, movable door element 52, first side wall 70, movable housing element 72, and portions 76, 80 and 82 thereof are made of sheet metal, formed from stainless steel. However, it is also possible that all or only a fraction of portions of housing H are made of other suitable materials, like plastic. When clipping machine CM is used for producing foodstuff, like sausages, it is particularly desired that the used material is food-safe.

Figure 3:
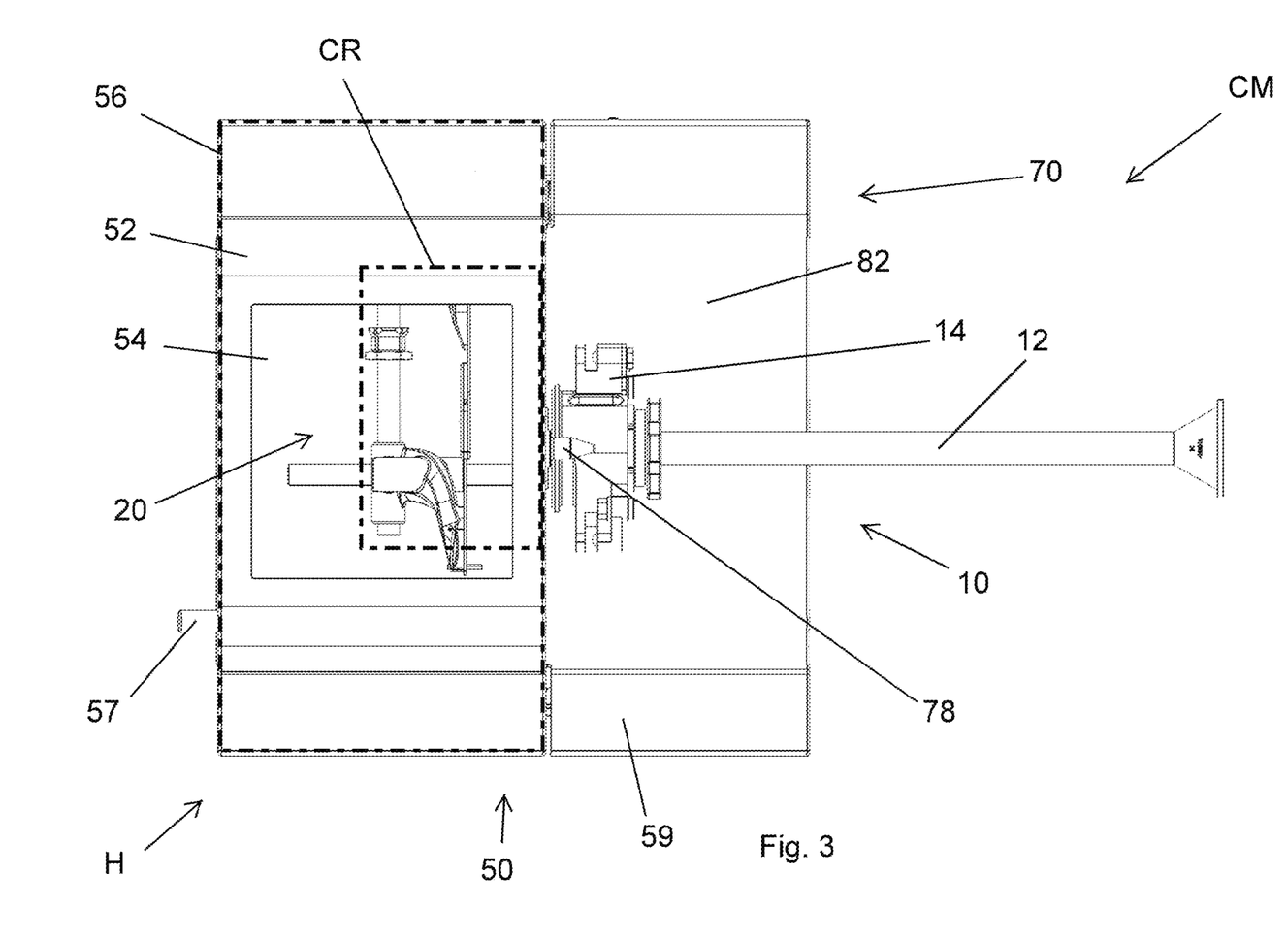
FIG. 3: is a frontal view of the clipping machine of FIG. 2.

FIG. 3 is a frontal view of clipping machine CM of FIG. 2, with movable door element 52 and movable housing element 72 (only partially visible in the depicted view) in their respective closed positions. Dashed lines mark closing region CR, which is covered by housing H, in the depicted frontal view in particular by movable door element 52. Second dashed lines indicate the position of opening 56 in front wall 50, which is closed by movable door element 52 in the depicted configuration. A portion of closing means 20 is visible through window 54.

In the depicted embodiment, opening 56, and therefore movable door element 52, is substantially larger than closing region CR. It has to be understood that opening 56, and therefore movable door element 52, may be smaller than depicted, for example opening 56 and closing region CR may substantially be congruent. Opening 56, and therefore movable door element 52, may also be smaller than the depicted outline of closing region CR, as long as opening 56 is sufficiently large to provide access to closing region CR, when movable door element 52 is in an open position.

Figure 7:
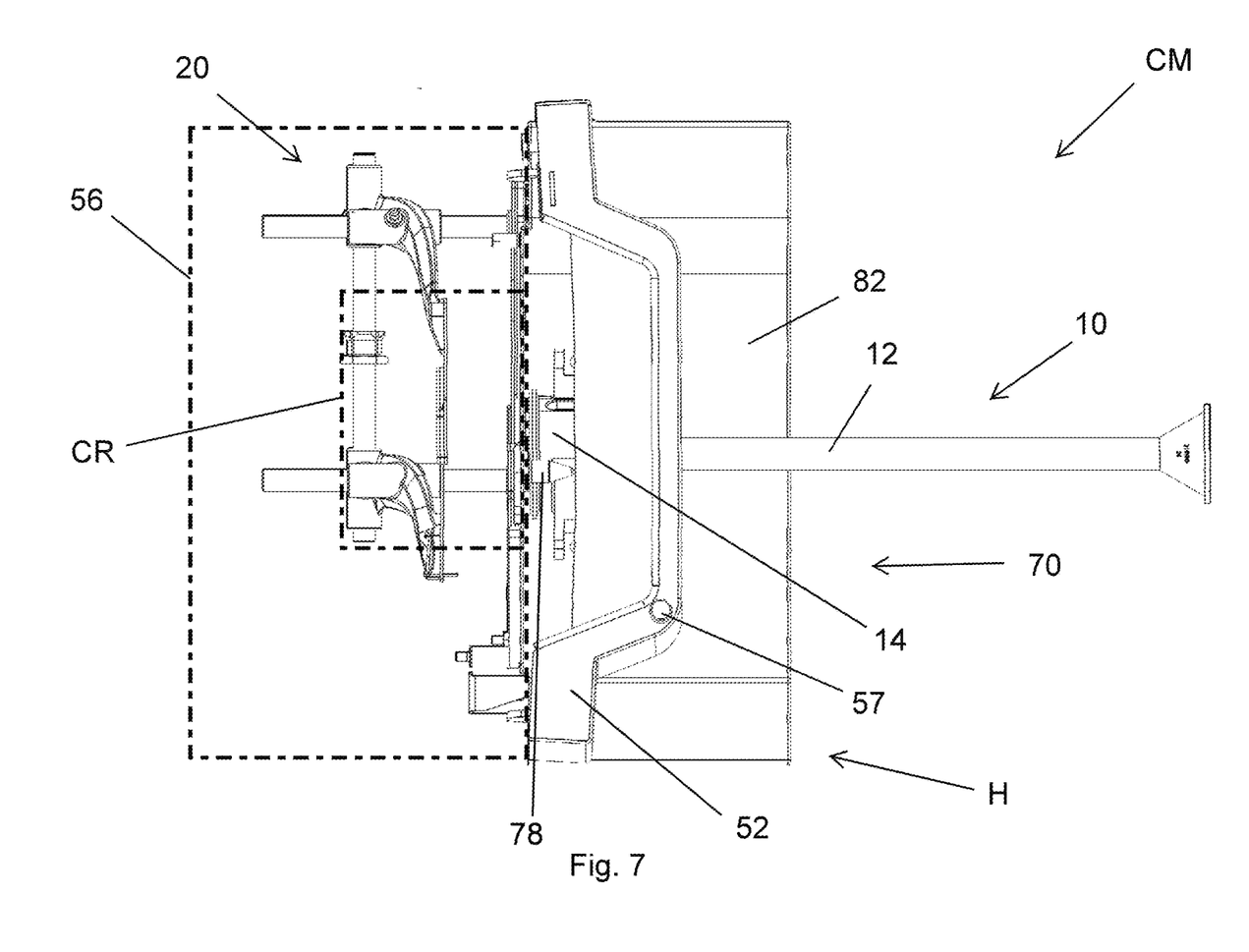
FIG. 7: is a frontal view of the clipping machine of FIG. 2, with the movable housing element and the movable door in their respective open positions.

FIG. 7 is a view of clipping machine CM from the same perspective as FIG. 3, wherein movable door element 52 and movable housing element 72 are depicted in their respective open positions, thereby exposing opening 56 and, thus, closing region CR.

It has to be further understood that closing region CR defines a volume, enclosing as previously stated the area of clipping machine CM, through which filled tubular packaging casing M is moved and in which filled tubular packaging casing M is gathered by gathering means 24 for forming plait-like portion P, and at least one closure clip C is applied to plait-like portion P by clipping tools 22. Dashed lines marked CR in FIG. 3 (as well as FIGS. 1 and 7) are therefore a projection of three dimensional closing region CR onto the plane of view.

Figure 5:
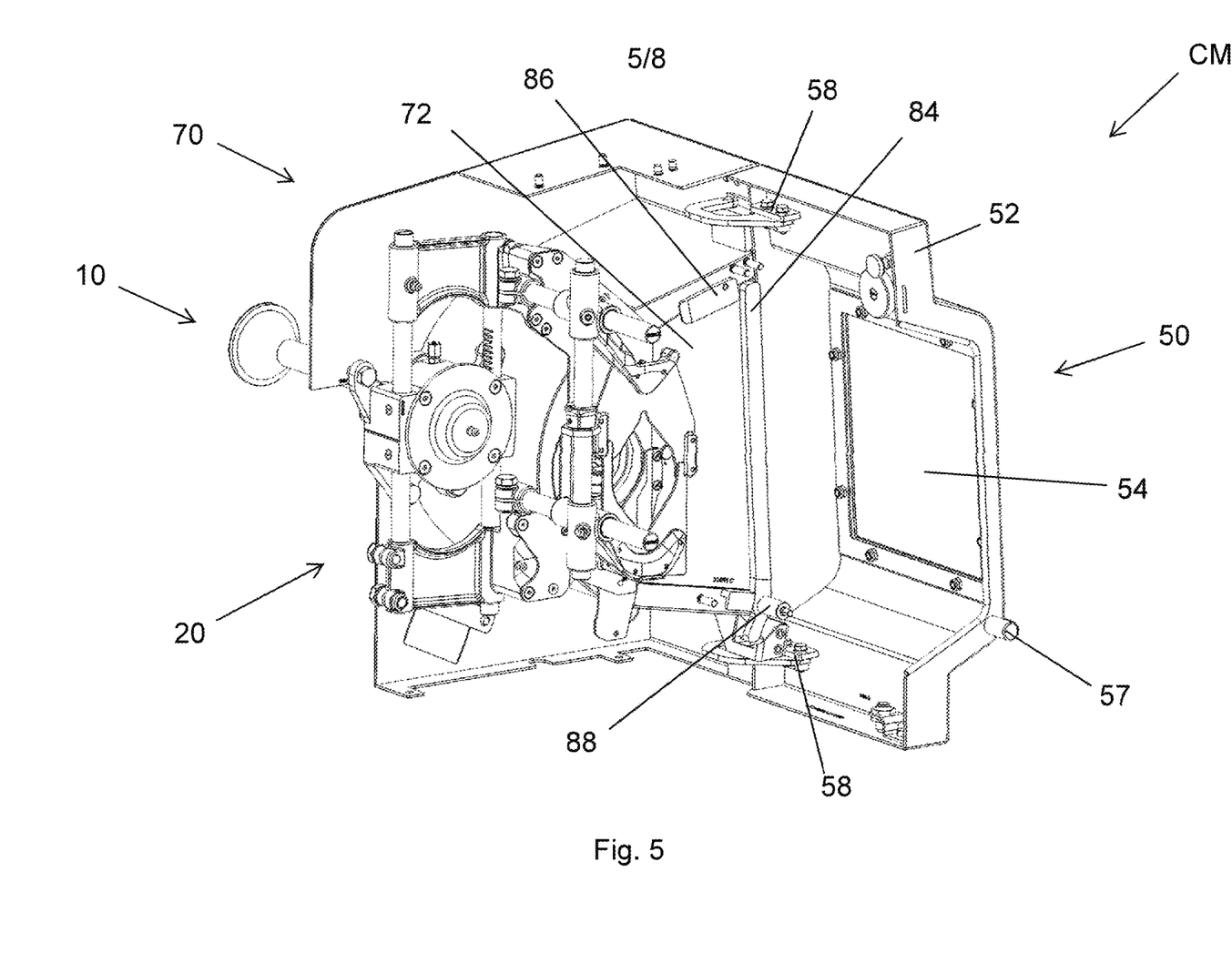
FIG. 5: is a perspective interior view of the clipping machine of FIG. 2, which shows closing means located within a housing of the machine.

FIG. 5 is a perspective view on the inside of clipping machine CM, allowing a view on closing means 20, and the interior surfaces of first side wall 70 and front wall 50, as well as their elements, in particular movable housing element 72 and movable door element 52, which are shielded from view in FIGS. 2, 3 and 4. Both movable housing element 72 and movable door element 52 are shown in their respective closed positions.

Movable door element 52 further comprises hinge mechanism 58, configured as a two-part concealed hinge, with a first hinge 58 arranged at an upper section and a second hinge 58 arranged at a lower section of the interior surface of the movable door element 52, connecting movable door element 52 with an upstream segment of front wall 50. Hinge mechanism 58 thereby allows movable door element 52 to rotate around a substantially vertical axis and be moved reversibly from the closed position depicted in FIGS. 2, 3, 4 and 5 to the open position depicted in FIGS. 6, 7 and 8, and vice versa.

In the depicted embodiment, the open position of movable door element 52 is thus located in an upstream direction. It has to be understood, however, that a hinge mechanism may also be arranged with an axis of rotation substantially parallel to feeding axis F, thereby locating the open position of movable door element 52 upwards or downwards of its closed position. In alternative embodiments, movable door element 52 may be opened and closed by a shifting mechanism, which shifts movable door element 52 within a plane that is substantially parallel to feeding direction F. In the embodiment depicted in FIGS. 2, 3, 4 and 5, pulling on handle 57 will rotate movable door element 52 from the closed position to the open position.

Hinge mechanism 58 is a concealed hinge, which means that first and second hinge 58 are not visible from the outside of machine CM, when movable door element 52 is in the closed position. Furthermore, hinge mechanism 58 being a concealed hinge allows for movable door element 52 to close flush with portion 59 of front wall 50 that is adjacent to opening 56, as depicted, for example, in FIGS. 2 and 4. It further allows movable door element 52 to close flush with adjacent movable housing element 72, and its adjacent portion 76 of first side wall 70, as depicted, for example, in FIGS. 2 and 4.

FIG. 5 further shows that movable housing element 72 further comprises a stiffening member 84, a locking mechanism 86 and a rotational joint 88. Stiffening member 84 is located at a portion of movable housing element 72 that is adjacent to movable door element 52, when door element 52 and movable housing element 72 are both in their respective closed positions. Stiffening member 84 in the depicted embodiment is a beam element of increased cross-section which extends in a vertical direction. Stiffening member 84 is advantageous, because movable housing element 72 is preferably made from the same material, having the same thickness as adjacent portion 76 of side wall 70, which is typically sheet metal made from stainless steel, and therefore provides only limited bending stiffness, particularly when not constrained on its edges. Stiffening member 84 therefore reduces the risk of movable housing element 72 deflecting, particularly in a direction perpendicular to the plane of first side wall 70, and thereby, for example, potentially colliding with closing means 20. In the depicted embodiment of inventive clipping machine CM, movable housing element 72 closes flush with adjacent portion 76 of first side wall 70.

Locking means 86 are located at an upper edge of the interior surface of movable housing element 72, providing a releasable connection with adjacent portion 76 of first side wall 70, for example by means of a spring-biased bolt and a corresponding bore. Movable housing element 72 can thereby be manually releasably locked in the closed position, without the need for using tools.

Rotational joint 88 is located at a lower end of stiffening member 84, connecting movable housing element 72 and adjacent portion 76 of first side wall 70. Rotational joint 88 further provides a substantially vertical axis of rotation, around which movable housing element 72 can be rotated from the closed to the open position, and vice versa. By locating the rotational joint 88 at a lower end of movable housing element 72 and toward front wall 50, as depicted, inter alia, in FIG. 5, the center of mass of movable housing element 72 is located above its axis of rotation in such way that the torque which the mass of movable housing element 72 exerts upon its axis of rotation is always directed such that the current position, open or closed, of movable housing element 72 is stable and maintained without further measures. In other words, when movable housing element 72 is rotated into the open position, it tends to remain in the open position, and poses no risk of moving into the closed position without external forces applied. Thereby, an unintended closing of movable housing element 72 and subsequent potential injury of an operator working in the range of movement of movable housing element 72 can be prevented.

It has to be understood, however, that rotational joint 88 may also be located at an upper end of movable housing element 72, or may be replaced by other means, such as a shifting mechanism, which shifts movable housing element 72 in a plane perpendicular to longitudinally extending axis A.

Figure 6:
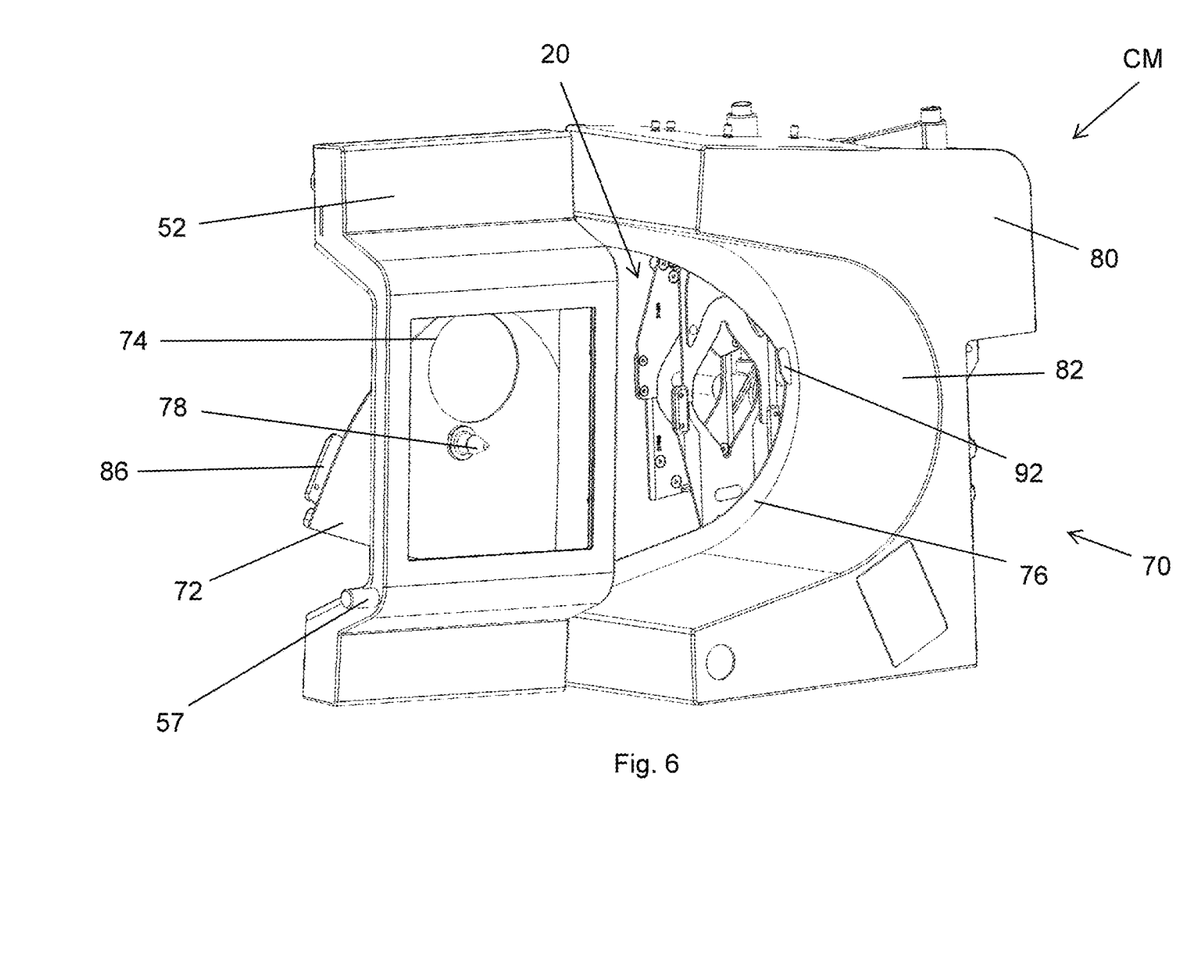
FIG. 6: is a perspective exterior view of the clipping machine of FIG. 2, with the filling means removed, which shows the movable housing element and the movable door element in their respective open positions.
Figure 8:
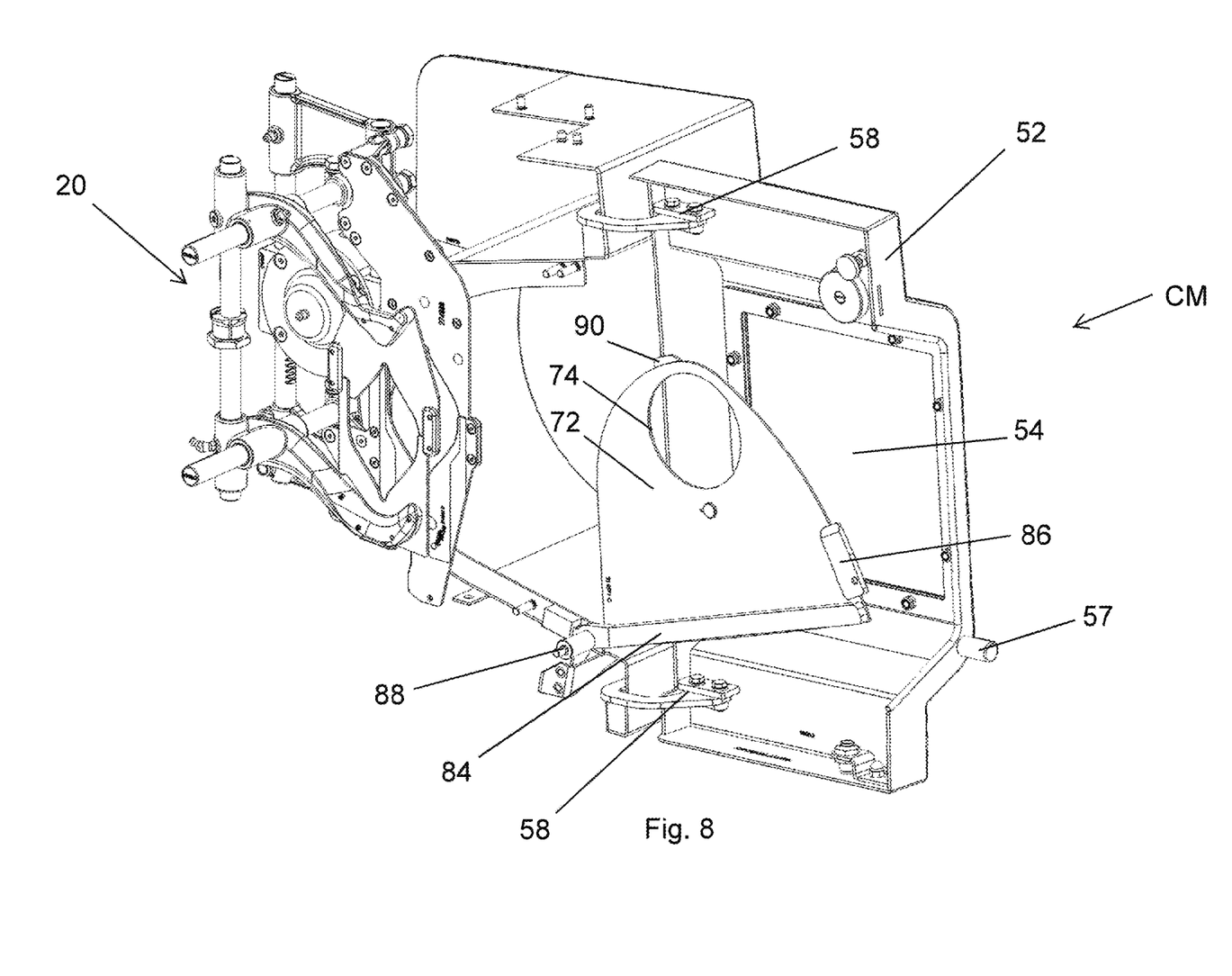
FIG. 8: is a perspective interior view of the clipping machine of FIG. 2, with the filling means removed, which shows the movable housing element and the movable door element in their respective open positions.

FIGS. 6 and 8 provide perspective views of clipping machine CM with both movable housing element 72 and movable door element 52 in their respective open positions. An advantage of movable housing element 72 lies in providing access to closing region CR, and thereby closing means 20, from a side of first side wall 70. In particular, the open position of movable housing element 72 allows access to upstream facing surfaces of closing means 20, which would otherwise be substantially inaccessible to an operator for purposes such as cleaning or maintenance, due to their desired close positioning with respect to filling means 10 (not depicted in FIGS. 6 and 8), and thus first side wall 70.

FIGS. 6 and 8 further demonstrate an additional advantage of the depicted preferred embodiment. With rotational joint 88 and hinge mechanism 58 located as shown in the depicted preferred embodiment, the open position of movable housing element 72 blocks door element 52 from being moved into the closed position, as the open position of movable housing element 72 lies in the range of motion, which movable door element 52 has to pass through to reach the closed position. The closed position of movable housing element 72 is arranged such that movable door element 52 is free to move to its respective closed position.

FIGS. 2, 4 and 5 further depict how the closed position of door element 52 blocks movable housing element 72 from being moved into the open position, as movable housing element 72 closes flush with the upstream end of movable door element 52, which therefore lies in the path of movement required by movable housing element 72 to move to the open position.

As can be inferred from FIG. 5, stiffening member 84 may act as an additional element of blockage that would collide with movable door element 52, if an operator would try to open movable housing element 72, with door element 52 in the closed position. The open position of movable door element 52 is arranged such that it unblocks the path of movement of movable housing element 72, which housing element 72 travels along from the closed to the open position.

It is thereby ensured that the sequence of opening and closing movable housing element 72 and door element 52 is predetermined. Thus, movable housing element 72 can only be opened after door element 52 has been opened, and it is further ensured that door element 52 can only be closed once movable housing element 72 has been moved into the closed position. Such an arrangement provides additional safety to the operator, in particular when the operation of clipping machine CM is prevented when door element 52 is in the open position. For example, a first sensor element may be provided to detect the closed position of door element 52, and a control unit may prevent the operation of machine CM, as long as the closed position is not detected. A further advantage of the depicted embodiment is that the need for a second sensor element, which detects the closed position of movable housing element 72, and wherein a control unit prevents the operation unless the closed positions of both movable housing element 72 and door element 52 are detected, may be avoided. However, for example for reasons of redundancy, such a second sensor element may still be provided in an alternative embodiment.

In a further alternative embodiment, it may be desired to provide a first and second sensor element, when an opening sequence of movable door element 52 and movable housing element 72 is not predetermined by their relative positioning with respect to each other, different from and in contrast to the depicted embodiment.

It has to be understood that the advantage of a predetermined opening sequence of movable door 52 and movable housing element 72 may be achieved by other arrangements of opening mechanisms than that of the depicted embodiment. Other configurations wherein door element 52 is arranged such that it is situated in the plane of movement of movable housing element 72 when door element 52 is in the closed position, and wherein door element 52 is moved out of the plane of movement of movable housing element 72 when door element 52 is moved into the open position, as is provided with the present embodiment, may exhibit the same advantage. Such configurations include, for example, afore-mentioned shifting mechanisms for movable housing element 72 and movable door element 52.

Movable housing element 72 further comprises, as is shown in FIGS. 4 and 8, a guide element 90 which prevents movable housing element 72 from deflecting into closing region CR, particularly when being moved from the open to the closed position and vice versa. Guide element 90 of the depicted embodiment is disposed on a side of movable housing element 72 that faces filling means 10, and further extends beyond the outer rim of movable housing element 72. Guide element 90 is configured to guide movable housing element 72 along adjacent section 76 of side wall 70 by providing form closure, which prevents movable housing element 72 from deflecting into closing region CR. It has to be understood that even though only one guide element 90 is depicted, multiple guide elements 90 may be present, or alternatively none.

Moreover, as shown in FIGS. 4 and 6, first side wall 70 can further comprise at least one stopper element 92, which is disposed on a side of first side wall 70 which faces filling means 20. Stopper element 92 extends beyond the rim of first side wall 70 toward movable housing element 72, and stopper element 92 thereby prevents movable housing element 72 from deflecting in a direction opposite closing region CR. In other words, stopper element 92 engages with movable housing element 72 and provides form closure, so that movable housing element 72 may not deflect in a direction opposite closing region CR. It has to be understood that even though only one stopper element 92 is depicted, multiple stopper elements 92 may be present, or alternatively none.

What is claimed is:

1. A clipping machine for producing sausage-shaped products containing a flowable filling material in a tubular or bag-shaped packaging casing, the clipping machine comprising:
    a filling device having a longitudinally extending axis, the filling device configured to feed filling material into the tubular or bag-shaped packaging casing;
    a closing device arranged downstream the filling device, for closing the tubular or bag-shaped packaging casing in a closing region; and
    a housing enclosing at least the closing region and comprising at least a front wall and a first side wall, wherein the front wall is arranged at least substantially parallel to the longitudinally extending axis of the filling device and further comprises an opening which can be closed by a movable door element being moveable between an open position allowing access to the closing region, and a closed position covering the closing region for blocking access to the closing region, and wherein the side wall faces the filling device and intersects the longitudinally extending axis of the filling device;
    wherein the side wall further comprises a movable housing element, movable between at least an open position and a closed position, wherein the movable housing element comprises an opening for passing through the sausage-shaped products to be produced, and wherein the movable housing element enables access from a side of the first side wall to the closing region when in the open position; and wherein the movable housing element covers the closing region for blocking access to the closing region when in the closed position.

2. The clipping machine of claim 1, wherein the closed position of the door element blocks the movable housing element from being moved into the open position; and
    wherein the open position of the movable housing element blocks the door element from being moved into the closed position.

3. The clipping machine of claim 1, wherein the movable housing element is a flat element, which has substantially the same thickness as an adjacent portion of the first side wall.

4. The clipping machine of claim 1, wherein the movable housing element further comprises at least one stiffening member.

5. The clipping machine of claim 4, wherein the stiffening member is disposed at a portion of the movable housing element that is adjacent to the door element, when the door element and the movable housing element are in the closed position.

6. The clipping machine of claim 1, wherein the movable housing element further comprises a rotational joint with an axis of rotation that is substantially parallel to the longitudinally extending axis of the filling device, wherein the movable housing element is movable between the open position and the closed position by rotating around said axis of rotation.

7. The clipping machine of claim 6, wherein the rotational joint is arranged at a position towards a bottom of the portion of the first side wall which is adjacent to the movable housing element.

8. The clipping machine of claim 1, wherein the movable housing element further comprises a locking mechanism for releasably locking the movable housing element in the closed position.

9. The clipping machine of claim 1, wherein the movable housing element further comprises at least one guide element that prevents the movable housing element from deflecting into the closing region.

10. The clipping machine of claim 9, wherein the at least one guide element is disposed on a side of the movable housing element that faces the filling device, and further extends beyond the outer rim of the movable housing element.

11. The clipping machine of claim 10, wherein the first side wall further comprises at least one stopper element, disposed on a side of the first side wall facing the filling device, the stopper element extending beyond the rim of the first side wall toward the movable housing element, wherein the stopper element prevents the movable housing element from deflecting in a direction opposite the closing region.

12. The clipping machine of claim 1, wherein the movable housing element further comprises a centering mandrel for centering an assembly of multiple filling devices on the clipping machine.

13. The clipping machine of claim 1, wherein the door element comprises a shifting mechanism, wherein the door element is movable between the open and the closed position by shifting in a plane parallel to the longitudinally extending axis of the filling device.

14. The clipping machine of claim 1, wherein the door element comprises a hinge mechanism with an axis of rotation extending at least substantially vertical to the longitudinally extending axis of the filling device.

15. The clipping machine of claim 1, wherein a sensor device is provided for detecting at least the closed position of the door element.

* * * * *

UNITED STATES PATENT AND TRADEMARK OFFICE
CERTIFICATE OF CORRECTION

| | |
|---|---|
| PATENT NO. | : 11,219,223 B2 |
| APPLICATION NO. | : 16/850785 |
| DATED | : January 11, 2022 |
| INVENTOR(S) | : Björn Weidenhaus |

It is certified that error appears in the above-identified patent and that said Letters Patent is hereby corrected as shown below:

In the Specification

Cross-Reference to Related Application, Column 1, Line 9, delete "2020" and insert -- 2019 --.

Signed and Sealed this
Twenty-fifth Day of October, 2022

Katherine Kelly Vidal
*Director of the United States Patent and Trademark Office*